United States Patent [19]

Gladding

[11] Patent Number: 5,088,448
[45] Date of Patent: Feb. 18, 1992

[54] COMBINED PET HITCHING POST AND STORAGE DEVICE

[76] Inventor: Mary A. Gladding, 195 Brookside Dr., Hope, Ind. 47246

[21] Appl. No.: 689,636

[22] Filed: Apr. 23, 1991

[51] Int. Cl.⁵ .............................................. A01K 3/00
[52] U.S. Cl. ................................................ 119/121
[58] Field of Search ............... 119/117, 121, 122, 124, 119/125

[56] References Cited

U.S. PATENT DOCUMENTS

| | | | |
|---|---|---|---|
| 676,968 | 6/1901 | Stanton | 119/122 |
| 918,579 | 4/1909 | Murch | 119/125 |
| 1,550,276 | 8/1925 | Nilson | 119/121 |
| 2,360,199 | 10/1944 | Cawley | 119/121 |
| 3,123,052 | 3/1964 | Marshall | 119/124 |
| 3,508,525 | 4/1970 | Sawyer | 119/117 |
| 3,921,589 | 11/1975 | McGahee | 119/117 X |
| 4,802,443 | 2/1989 | Denmark | 119/19 |

FOREIGN PATENT DOCUMENTS 3949 of 1912 United Kingdom ............... 119/121

Primary Examiner—Gene Mancene
Assistant Examiner—R. Thomas Price
Attorney, Agent, or Firm—H. Jay Spiegel

[57] ABSTRACT

Disclosed is a device including a hitching mechanism designed to allow attachment of a chain for restraining a pet such a dog. The device has a housing preferably made to resemble a fire hydrant and including a storage chamber inside. The housing has a plurality of ground insertion spikes which may be retracted when not in use.

7 Claims, 2 Drawing Sheets

COMBINED PET HITCHING POST AND STORAGE DEVICE

BACKGROUND OF THE INVENTION

The present invention relates to a combined pet hitching post and storage device.

In the prior art, hitching devices are known, however Applicant is unaware of any such device including all of the aspects and features of the present invention.

U.S. Pat. No. 2,790,419 to Sullivan discloses a tethering post having a freely swiveling hook with a ground insertion spike. However, Sullivan fails to teach the housing structure of the present invention nor the retractable ground insertion spike structure thereof.

U.S. Pat. No. 4,796,566 to Daniels discloses a convertible tethering system including a ground insertion spike and a tethering device including a tether retractable onto a reel. Of course, the present invention is different from the teachings of Daniels as including storage structure as well as retractable ground insertion spikes.

SUMMARY OF THE INVENTION

The present invention relates to a combined pet hitching post and storage device. The present invention includes the following interrelated objects, aspects and features:

(a) In a first aspect, the inventive device includes a housing preferably made to resemble a fire hydrant. This is an appearance which is particularly attractive to a dog and will aid in preventing the dog from attempting to break the tether and escape.

(b) On top of the housing, a pivotable handle is provided allowing easy transport of the device. Additionally, a swivel having a ring designed to receive a coupling of a tether is fastened to the top of the housing.

(c) The bottom of the housing contains a sub-chamber from which a plurality of ground insertion spikes are extendable. These spikes may be inserted into the ground to fixedly locate the device in position or, when desired, to allow easy transport of the device, the ground insertion spikes may be pivoted and retracted within individual tubular storage devices within the sub-chamber.

(d) The housing includes a further sub-chamber accessible through a door in the side of the housing which allows storage of the animal tether or other items.

As such, it is a first object of the present invention to provide a combined pet hitching post and storage device.

It is a further object of the present invention to provide such a device having retractable ground insertion spikes and a carrying handle.

It is a further object of the present invention to provide such a device having a storage chamber designed to allow storage of an animal tether.

It is a yet further object of the present invention to provide such a device including a swivel designed to have attached thereto an animal tether.

These and other objects, aspects and features of the present invention will be better understood from the following detailed description of the preferred embodiment when read in conjunction with the appended drawing figures.

SPECIFIC DESCRIPTION OF THE PREFERRED EMBODIMENT

Figure 1:
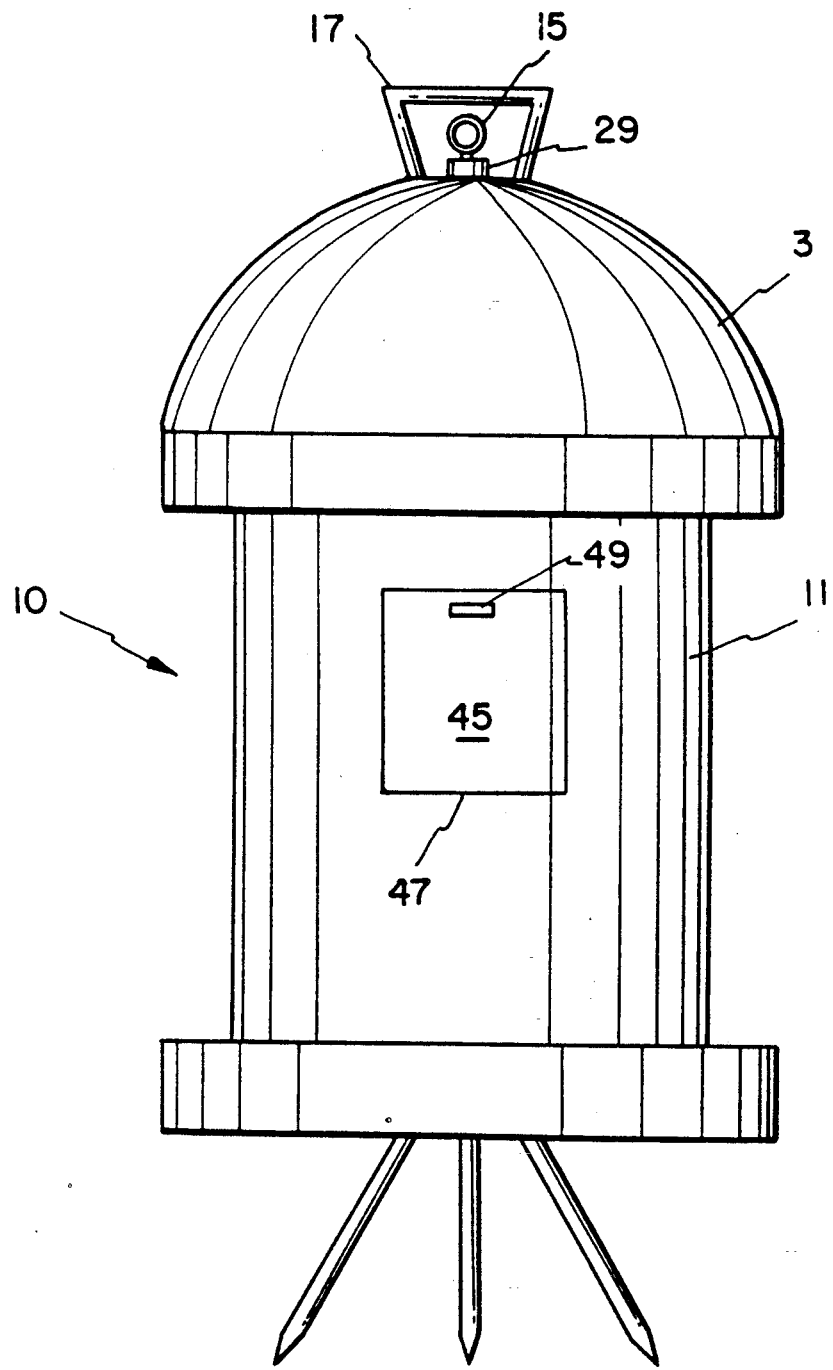
FIG. 1 shows a side view of the present invention.

With reference, first, to FIG. 1, the present invention is generally designated by the reference numeral 10 and is seen to include a housing 11 preferably made in the likeness of a fire hydrant. This is done because the likeness of a fire hydrant is particularly attractive to dogs and, the use of such a design will aid in deterring a dog tethered to the device from wanting to stray far away.

Figure 2:
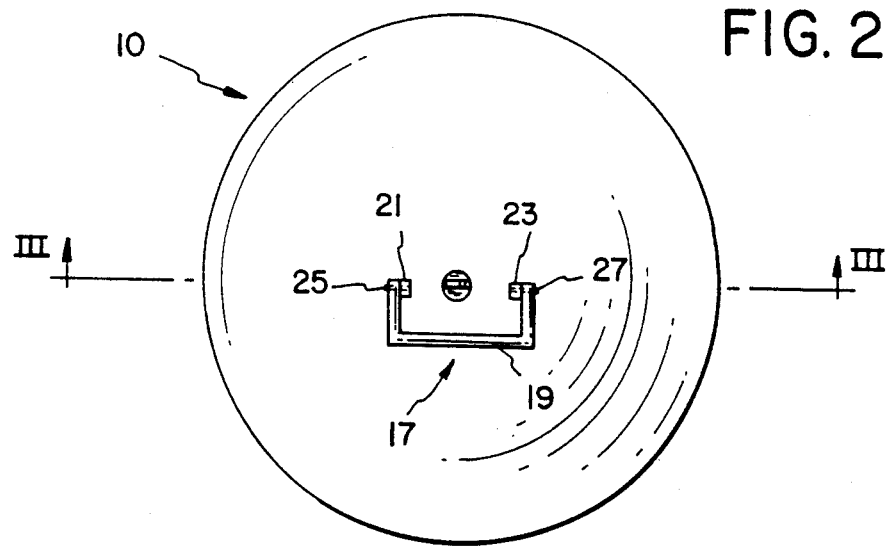
FIG. 2 shows a top view of the present invention.
Figure 3:
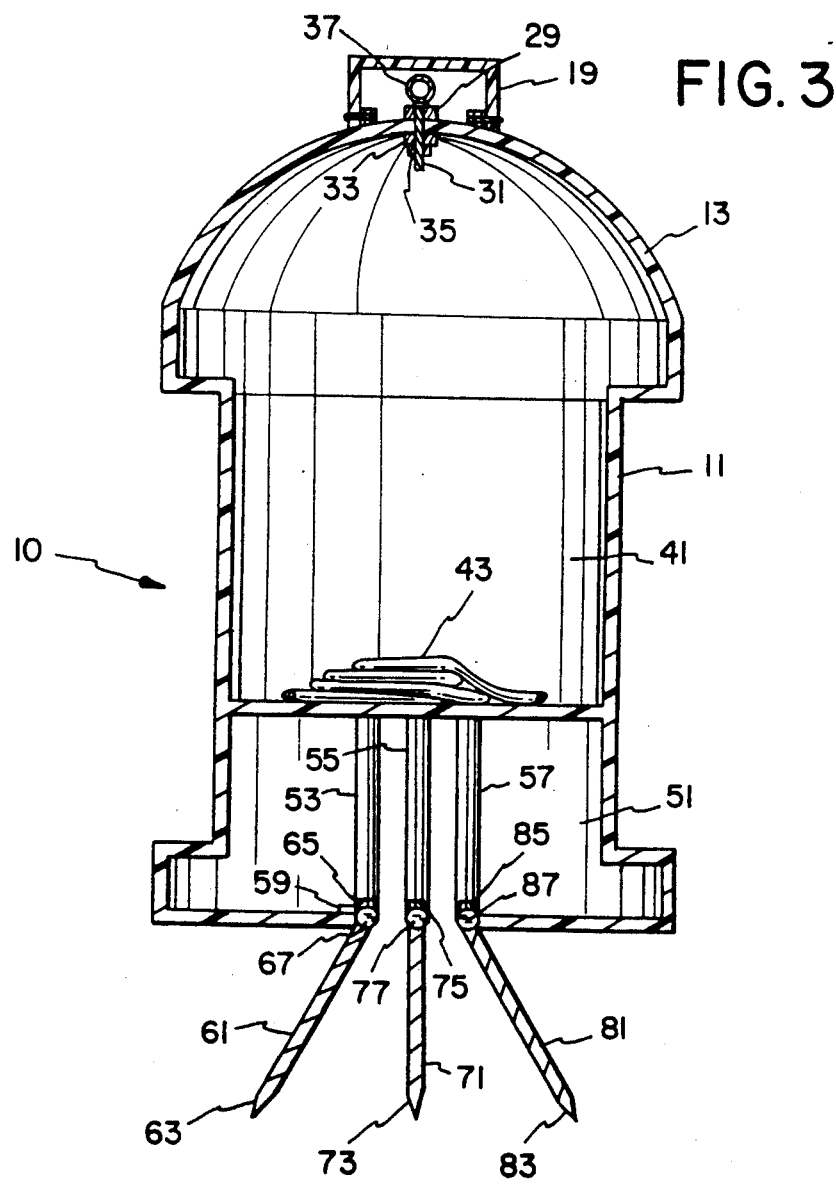
FIG. 3 shows a cross-sectional view along the line III—III of FIG. 2, with the handle thereof being pivoted to a different position than that which is shown in FIG. 2 to show detail.

The housing 11 includes a cap 13 made to resemble the cap of a fire hydrant and having mounted thereon a swivel 15 and a handle 17. With particular reference to FIG. 2, the handle 17 includes a handle portion 19 and mounting posts 21, 23 with respective pins 25, 27 extending between the posts 21, 23 and the handle 19 to pivotably mount the handle on the cap 13. In this way, when it is desired to transport the device 10, the handle 19 may be pivoted to the position shown in FIG. 1 and may be grasped by the user for easy transport. When the device is being used to tether an animal, the handle 19 may be pivoted to the position shown in FIG. 2. With particular reference to FIGS. 1 and 3, the swivel 15 is seen to include a base 29 attached to the cap 13 by a bolt 31 passing through the cap 13 and fixed in place by a block 33 and a nut 35 threadably received on the bolt 31.

A swivel ring 37 is rotatably mounted on the base 29 in a manner well known to those skilled in the art. With the handle 19 pivoted to the position shown in FIG. 2, the swivel ring 37 may freely rotate through a 360 degree movement to allow complete movement of an animal tethered thereto in all directions.

As shown in FIGS. 1 and 3, the housing 11 includes a first sub-chamber 41 designed to receive a tether such as the rope 43 illustrated in FIG. 3. An access door 45 may be pivoted about a hinge 47 to allow access to the sub-chamber 41. The door 45 has a handle 49 and may be locked in the closed position through the use of a suitable latch (not shown).

FIG. 3 also shows a second sub-chamber 51 having three hollow rods 53, 55 and 57 fixedly vertically mounted therein. A ground insertion spike 61 has a pointed end 63 and is pivotably mounted to a base 65 by a pivot 67. Similarly, a ground insertion spike 71 has a pointed end 73 and is pivotably mounted to a base 75 by a pivot 77. Similarly, a ground insertion spike 81 has a pointed end 83 and is pivotably mounted to a base 85 by a pivot 87.

As should be understood by those skilled in the art, the spikes 61, 71 and 81 may be extended to the position shown in FIG. 3 whereupon it may be pivoted to a locked position as shown in FIG. 3 whereupon they may inserted into the ground to fixedly mount the device 10 in position. If desired, the periphery of the opening 59 in the bottom of the sub-chamber 51 may be used as a limit stop to limit the outward pivoting of the spikes 61, 71 and 81. Alternatively, any suitable stopping mechanism may be employed.

When it is desired to transport the device 10, the spikes 61, 71 and 81 may be pivoted to a position in axial alignment with their respective tubes 53, 55, 57 whereupon they may be telescoped within their respective tubes so that they are retracted within the sub-chamber 51 to allow easy transport.

In the preferred embodiment of the present invention, the housing 11 and handle 19 are made of molded plastic. The spikes 61, 71 and 81 are preferably made of steel as are the tubes 53, 55 and 57. The swivel 15, 29 is made of a suitable strong metal to allow durability and prevent breakage. Of course, these preferred materials are merely exemplary and the various components of the present invention may be made of any material which is suitable for the intended purposes.

As such, an invention has been disclosed in terms of a preferred embodiment thereof which fulfills each and every one of the objects of the invention as set forth hereinabove and provides a new and useful combined pet hitching post and storage device of great novelty and utility. Of course, various changes, modifications and alterations in the teachings of the present invention may be contemplated by those skilled in the art without departing from the intended spirit and scope thereof.

As such, it is intended that the present invention only be limited by the terms of the appended claims.

I claim:
1. A hitching post, comprising:
 a) a housing having a handle;
 b) a plurality of ground insertion spikes movable from a first stored position within said housing to a second extended position; and
 c) a swivel mounted adjacent said handle with a tether removably attachable thereto;
 d) said housing having a first subchamber and a second subchamber, said first subchamber being accessible through an opening in a wall of said housing; said second subchamber receiving said spikes in said first position thereof.
2. The invention of claim 1 wherein said housing resembles a fire hydrant.
3. The invention of claim 1 wherein said handle is pivotably mounted on said housing.
4. The invention of claim 1 wherein said housing is made of plastic.
5. The invention of claim 1 wherein said plurality of spikes comprises, three spikes.
6. The invention of claim 1 wherein said second subchamber contains a separate storage tube for each spike.
7. The invention of claim 1, wherein said opening is closeable with a door.

* * * * *